(12) United States Patent
Huebl

(10) Patent No.: US 7,890,229 B2
(45) Date of Patent: Feb. 15, 2011

(54) METHOD AND DEVICE FOR WAKING USERS OF A BUS SYSTEM, AND CORRESPONDING USERS

(75) Inventor: Jochen Huebl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/748,993

(22) Filed: Dec. 29, 2003

(65) Prior Publication Data

US 2004/0145500 A1    Jul. 29, 2004

(30) Foreign Application Priority Data

Dec. 30, 2002   (DE)   ................. 102 61 387
Dec. 15, 2003   (DE)   ................. 103 58 584

(51) Int. Cl.
*G06F 7/00*   (2006.01)
(52) U.S. Cl. ............... 701/36; 340/825.21; 340/825.65; 340/825.57; 340/425.1; 713/324

(58) Field of Classification Search ............ 340/825.69, 340/825.72, 825.65, 425.1, 425.2, 825.21; 713/324, 314, 320
See application file for complete search history.

(56) References Cited

U.S. PATENT DOCUMENTS

| | | | | |
|---|---|---|---|---|
| 5,581,556 A | * | 12/1996 | Ohie | ......................... 370/431 |
| 5,914,796 A | * | 6/1999 | Selin | ......................... 398/118 |
| 6,029,061 A | * | 2/2000 | Kohlschmidt | ............... 455/574 |
| 6,282,668 B1 | * | 8/2001 | Neudecker | .................. 713/324 |
| 6,339,806 B1 | * | 1/2002 | Foster et al. | ................. 710/313 |
| 6,484,082 B1 | * | 11/2002 | Millsap et al. | ................ 701/48 |

* cited by examiner

*Primary Examiner*—Vernal U Brown
(74) *Attorney, Agent, or Firm*—Kenyon & Kenyon LLP

(57) ABSTRACT

A device for waking users of a bus system, wherein a detection means, in particular a counter, is provided, which detects at least one predefined signal feature of the signals transmitted on the bus system and initiates the further wake-up procedure once a predefinable number with respect to the signal feature has been reached.

14 Claims, 4 Drawing Sheets

METHOD AND DEVICE FOR WAKING USERS OF A BUS SYSTEM, AND CORRESPONDING USERS

BACKGROUND INFORMATION

Control devices in a motor vehicle are increasingly supplied with voltage on a continuous basis (also referred to as clamp 30 capability) in order to be able to execute certain monitoring and control functions even when the ignition is shut off. This may involve an access and entry authorization or a diagnosis case, for example. To reduce energy consumption, the control devices are brought into a so-called sleep mode. This is done either by switching off the voltage regulator or by entering a corresponding operating mode of the micro-controller.

When required, the control device must be awakened. This is accomplished either via a line to a wake-up input of the user's micro-controller provided for this purpose, or to a wake-up input of the voltage regulator. In the systems used today, which are generally networked, this may also occur by activity on the bus lines.

This has the disadvantage that either a separate wake-up line must be provided to all required control devices, or, in the case of a wake-up via the bus, all control devices, even those not required, are reactivated by intended or unintended bus activity, either by communication on the bus or by interference on the bus.

It is an object of the present invention to selectively wake up only those control devices that are needed to carry out the required functions, using the bus utilized in motor vehicles, in particular a CAN bus.

SUMMARY OF THE INVENTION

The present invention is based on a method and a device for waking up users of a bus system, a counter being provided which counts at least one predefined signal feature of the signals transmitted on the bus system and initiates the further wake-up procedure once a preselectable number has been reached.

In an advantageous manner, an edge or an edge change of the signal is provided as preselected signal feature.

It is also possible for a signal level or a certain combination of several signal levels to be conveniently provided as preselected signal feature.

Especially advantageous is that a time duration is determined in response to the first occurrence of the signal feature and that, from the time duration thus determined following the first occurrence relative to the time duration, binary information results that allows a selective wake-up of users of the bus system.

It is also possible to gather the user to be awakened from the obtained information; this may also be accomplished by the renewed transmission of another wake-up notification or message.

In an advantageous manner, the control devices connected to the bus may thus shut off their micro-controllers altogether or bring them into a sleep mode with a likewise switched-off clock generator; only the transceiver connected to the bus, in particular a CAN transceiver having minimal power consumption, must be supplied with stand-by power. By using the time duration, which is freely selectable, the decoding may be implemented independently of the utilized transmission rate of the bus system. In addition, the evaluation makes it possible to detect errors in the block structure with respect to the communication blocks in the bus system.

DETAILED DESCRIPTION

Figure 1:
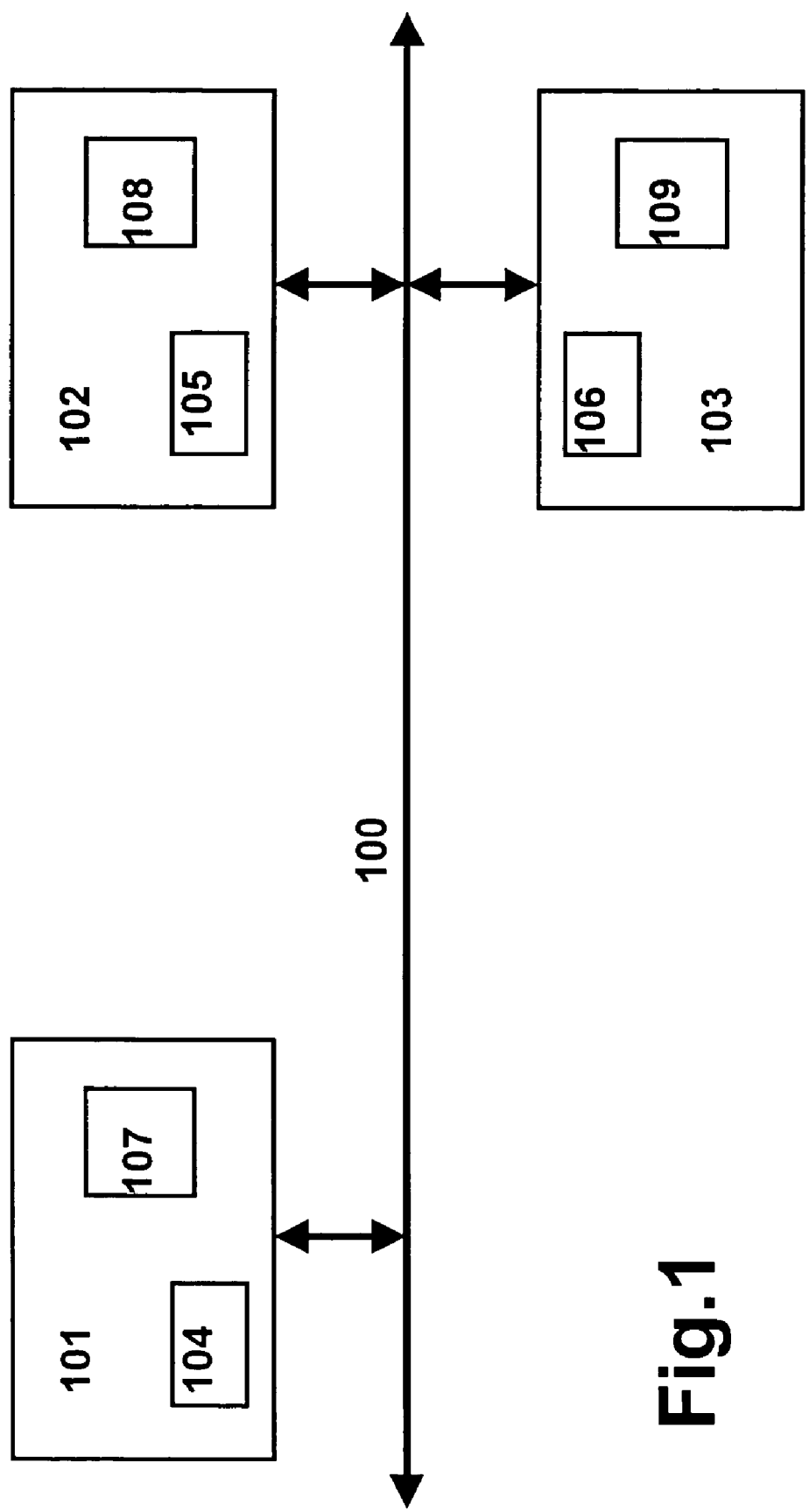
FIG. 1 shows a bus system having a plurality of users, at least two users.

FIG. 1 shows a bus system 100 with bus users 101, 102 and 103. These each include an implementing unit 107, 108 and 109, respectively, as well as a time-detection component or counter component or counter 104, 105 or 106. As already mentioned, in this exemplary embodiment only those control device required to carry out the required functions are to be selectively awakened, via the CAN bus often used in motor vehicles. In doing so, a grouping of devices that respond to the same wake-up information is possible too.

One possibility would be to use certain parts of a message/CAN frame (identifiers, for example) for the selection. However, this requires that the wake-up device is permanently connected to a clock generator, which, however, contributes considerably to the energy consumption. This type of wake-up requires that the transmission rate of the bus be known and that the clock generator have only very slight fluctuations in response to external influences, such as supply voltage or temperature etc. Consequently, the precise objective is to use or develop a selection method that operates in multiple steps and does not require a clock generator in the first step.

The control devices, or users 101, 102 and 103, connected to the bus may switch off their micro-controllers completely or bring them into a sleep mode with a switched-off clock generator. Only the CAN transceiver, i.e., the user having the lowest power consumption, user 101 in this case, for example, is supplied with stand-by power.

The selection mechanism is activated only when a characteristic signal is detected on the bus, and it is possible to activate the micro-controllers, for example, and/or additional voltage regulators of users 102 and 103, respectively.

The present invention may be designed equally as a one-step or as a two-step wake-up concept so as to further increase the waking reliability.

If a plurality of devices respond to the same wake-up mechanisms, i.e., to the same characteristic signals, entire device groups are able to be awakened, or the devices be combined into groups or special devices be awakened for special applications as well.

Due to the configuration of the logic, the information may be extracted from the message regardless of the used transmission rate, as will be explained in greater detail below. In the process, the number of changes between high and low or 0 and 1, i.e., the binary information, is largely constant.

It is especially preferred when the wake-up message is a message configured according to the CAN bus ISO standard. This message does not violate this standard and thus does not cause any problems in existing systems. A CAN controller, as it is used in other approaches, will then not be necessary.

It is especially advantageous that, following the initiation of the further wake-up procedure, the message is sent again and it is determined on this basis which users are to be selected for a complete wake-up.

Figure 2:
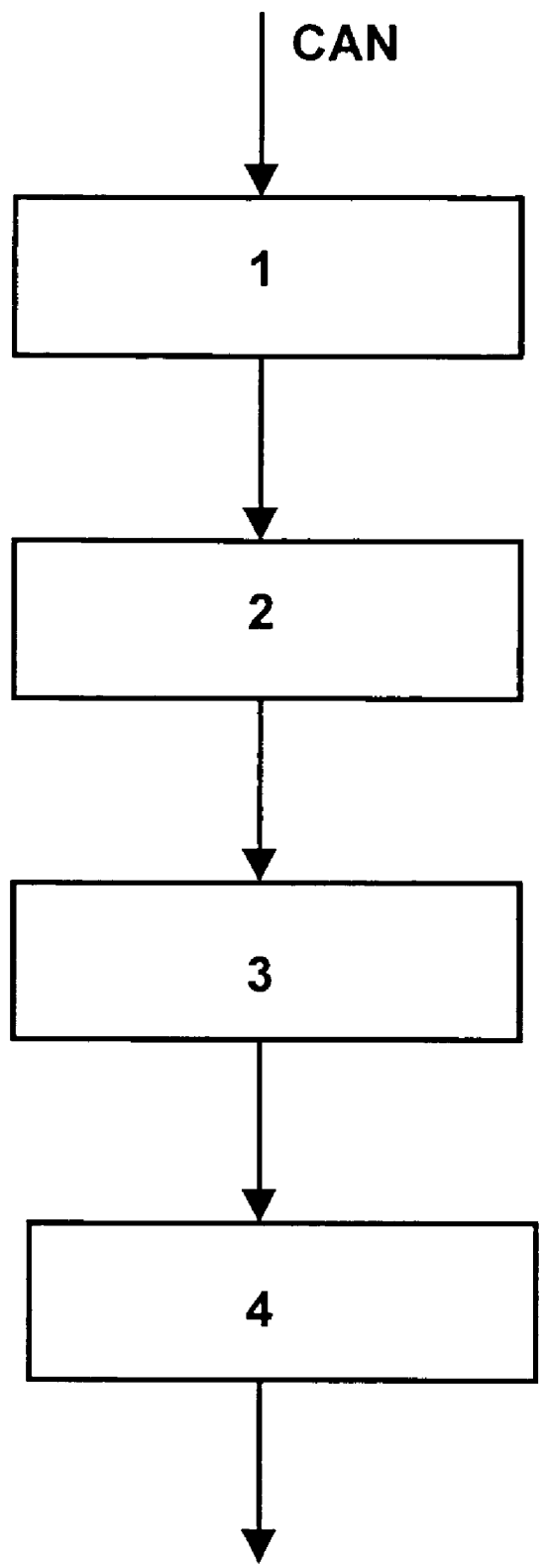
FIG. 2 shows a method sequence according to the present invention, in the form of a flow chart.

FIG. 2 shows the basic flow diagram as an example. The transmitter of the wake-up request sends a message A according to FIG. 3 on the bus in which the receiver or the receiver group to be awakened is encoded by a number, as in a CAN bus in the example shown. In the sleep mode, the bus is recessive. When the first message arrives, which may be detected by the change to dominant occurring in block 1 of FIG. 2, and by which a counter or the time acquisition is activated. Over a certain time period, which is influenced by several factors, the number of edges or signal levels as well, that is, of the message having n pulses, is counted in block 2 of FIG. 2. If this number is within the permissible limits, the second part of the circuit is activated. This results in a first separation of communication or interference on the bus and a wake-up request. If this comparison is positive, i.e, if a wake-up request is involved, the second step of the logic is energized. The transmitter now sends message A according to FIG. 3 for the second time. The wake-up logic, that is, the processing unit, in particular, then reads out from the message the number of the device or the device group that is to be awakened. This takes place in block 3 of FIG. 2. If the read-out number matches a stored number, the device is activated via activation of the voltage regulators or via waking of the micro-controller in block 4 of FIG. 2, and the corresponding user takes part in the bus traffic. The combination of blocks 2 and 3, as described before, is shown in this flow diagram. It is also possible to use only one of the two steps as wake-up criteria.

Figure 3:
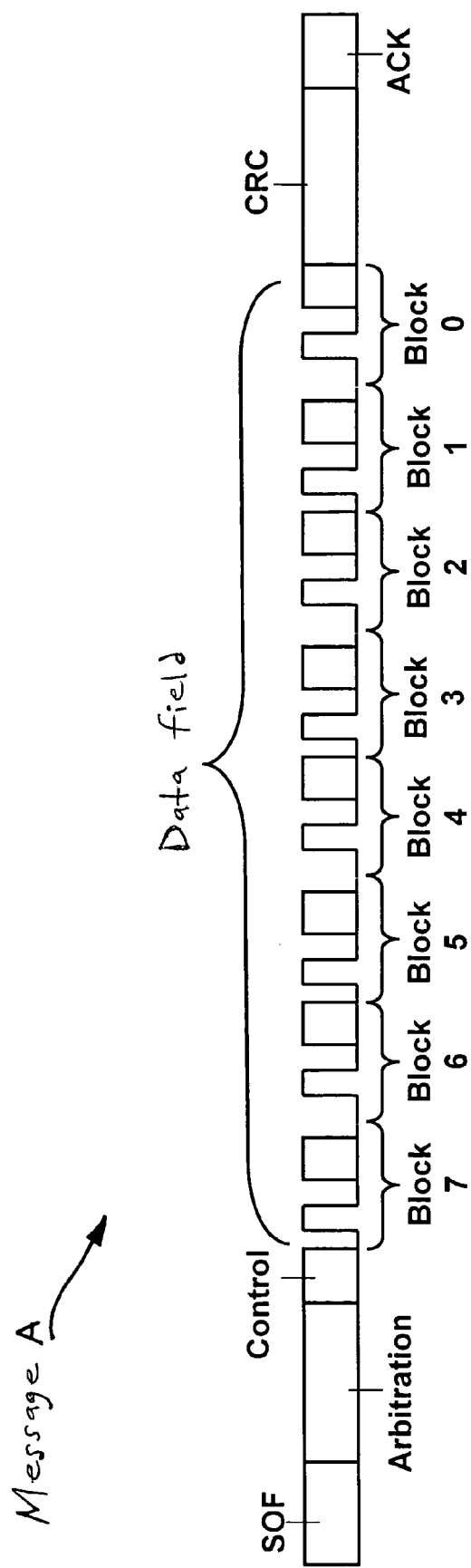
FIG. 3 shows, by way of example, a message having wake-up information encoded in the data field.

According to FIG. 3, message A is used in a preferred form as a message configured as CAN bus ISO standard. Provided are a start of frame, SOF, an arbitration field, which usually includes the identifier, and a control field before the data field. Included after the data field are a check number as cyclic redundancy check, CRC, and a confirmation field regarding the message transmission, an acknowledgment ACK. Message A includes the number of the device or the device group in the data field. The wake-up ID may be used as CAN identifier, that is, rrr rrrd rrrr according to CAN specification 2.0, r denoting recessive and d dominant. In this way, the frame corresponds to the CAN bus specification, and the communication of other devices via the CAN bus is not disturbed.

As shown in FIG. 3, the entire data field in the frame, in particular in the CAN frame, is made up of 64 bits in this case, subdivided into 8 blocks, namely block 0 to block 7. Encoded in each block is at least 1 bit of the device number. If exactly 1 bit of the device number is encoded in each block, the circuit is able, as shown, to obtain 8 bits from a CAN frame for the further processing. Due to the nesting of these 8 bits, errors in the transmission may be detected.

Figure 4:
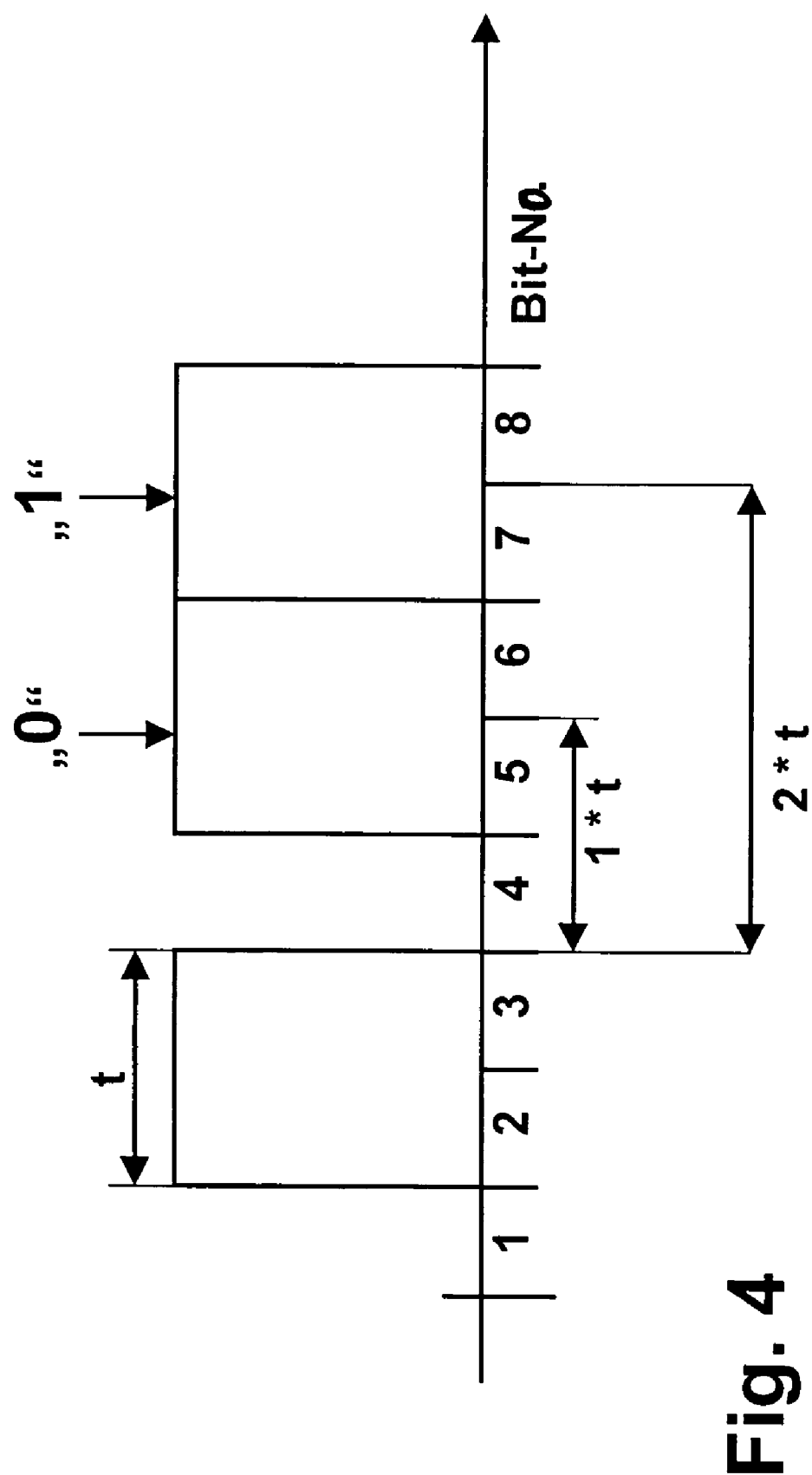
FIG. 4 shows the configuration, according to the present invention, of a block in the data field to determine the signal feature, with encoded information.

The special configuration of the individual blocks 0 through 7 from FIG. 3 is shown in FIG. 4. Due to this special configuration of the 8 blocks, the encoding can occur independently of the chosen transmission rate of the bus. In addition, errors in the block configuration may be detected as well. One block corresponds to 8 bits from the CAN data field.

The configuration of a block is shown in FIG. 4 by way of example. Bits 2 and 3 are on high to measure or determine a time t. After bit 3 ends, the wake-up logic or the processing unit waits out the previously determined time t once and stores the state that then occurs; it then waits out time t once again and then again stores the then occurring, renewed state. Time t and 2t, as shown in FIG. 4, may be selected such that a full high or low signal may be detected within the framework of the signal levels. In the same way, a detection of the signal edges, from bit 4 to bit 5 and bit 6 to bit 7, is conceivable by appropriate selection of the respective time segments. Regardless of the used transmission rate, this results in an encoding possibility for an 0-information, here in bit 5 and 6, and an 1-information, here via bit 7 and 8.

That means that, in the encoding by way of example in FIG. 4, bit 1 is always 0, bit 2 and bit 3 are always 1 for calibrating time (measuring-in time, or metering-in time) t, bit 4 in turn is always 0 for separating the calibration time from the actual binary information. Bit 5 and bit 6 are selected such here that they are on high, which then means a logical 0 for the block. Bits 7 and 8 are then chosen thus, which would mean a logical 1 for the block. In other words, if bits 5 and 6 are on 1, the block contains a logical 0, and if bits 7 and 8 are on 1, the block includes a logical 1. That means that the bits are set in such a way here that either the bits 5 and 6 or the bits 7 and 8 are on 1. Therefore, the method indicated here shows a transmission that is independent of the baud rate, in particular by the counting of edges or edge changes or the corresponding signal levels, respectively, according to the individual, preselected signal feature; in one case, as a first wake-up step and, in the other case, when evaluating a retransmitted message, as a multi-step concept. As already mentioned, the preselected signal feature may be the signal level, that is, 0 or 1, as in the example of FIG. 4, or also, as already explained, the evaluation of the signal edges or the change in the signal edge. This results in a simple possibility for the selective wake-up of control devices, without additional line requirements and without always energizing all users of the bus system, even those not required.

What is claimed is:

1. A device for waking up at least one targeted user of a bus system without waking up all of the users of the bus system, comprising:
    a detection device for implementing a two-step wake-up procedure including:
        performing a first step of transmitting, from a transmitter, a message on the bus system for detecting at least one predefined signal feature of the message and determining, as a function of a data pattern encoded within the message, the at least one targeted user as an intended target;
        at only one of the users, receiving the message;
        at the only one of the users receiving the message, determining if a preselected number of occurrences of the at least one predefined signal feature of the message has been reached;
        after the only one of the users has determined that the preselected number of occurrences has been reached, retransmitting, from the transmitter, the message on the bus system; and
        determining one of a number of the users to be awakened and a group of users to be awakened based on the retransmitted message, each user being awakened only if the data pattern identifies at least one of the user and a group to which the user belongs;
    wherein a length of the message is at least two bits, and
    wherein the preselected number of occurrences of the at least one predefined signal feature is greater than one.

2. The device according to claim 1, wherein the at least one signal feature includes at least one of an edge and an edge change of a signal.

3. The device according to claim 1, wherein the at least one signal feature includes at least one of a signal level and a preselected combination of a plurality of signal levels.

4. A targeted user of a bus system, comprising:
a detection device for implementing a two-step wake-up procedure including:
- performing a first step of transmitting, from a transmitter, a message on the bus system for detecting at least one predefined signal feature of the message and determining, as a function of a data pattern encoded within the message, the at least one targeted user as an intended target;
- at only one of the users, receiving the message;
- at the only one of the users receiving the message, determining that a preselected number of occurrences of the at least one predefined signal feature of the message has been reached;
- after the only one of the users has determined that the preselected number of occurrences has been reached, retransmitting, from the transmitter, the message on the bus system; and
- determining one of a number of the users to be awakened and a group of users to be awakened based on the retransmitted message, each user being awakened only if the data pattern identifies at least one of the user and a group to which the user belongs;

wherein a length of the message is at least two bits,
wherein the at least one predefined signal feature is assigned to the targeted user, whereby users of the bus system not associated with the at least one predefined signal feature do not detect the at least one predefined signal feature, and
wherein the preselected number of occurrences of the at least one predefined signal feature is greater than one.

5. A method for waking up at least one targeted user of a bus system without waking up all of the users of the bus system, the method comprising:

(a) transmitting a message, from a transmitter, on the bus system;
(b) detecting, at only one of the users, at least one predefined signal feature of the message;
(c) at the only one of the users receiving the message, determining that a preselected number of occurrences of the at least one predefined signal feature of the message has been reached;
(d) after the only one of the users has determined that the preselected number of occurrences has been reached, retransmitting, from the transmitter, the message on the bus system; and
(e) determining one of a number of the users to be awakened and a group of users to be awakened based on the retransmitted message, each user being awakened only if the data pattern identifies at least one of the user and a group to which the user belongs;

wherein a length of the message is at least two bits, and
wherein the preselected number of occurrences of the at least one predefined signal feature is greater than one.

6. The method according to claim 5, wherein the message is evaluated for a possible wake-up message once the at least one predefined signal feature is detected.

7. The method according to claim 5, further comprising determining a time duration when the signal feature occurs for a first time.

8. The method according to claim 5, wherein binary information results from a time duration following a first occurrence of the signal feature.

9. A targeted user of a bus system, comprising:
a detection device for implementing a two-step wake-up procedure including:
- performing a first step of transmitting, from a transmitter, a message on the bus system for detecting at least one predefined signal feature of the message and determining, as a function of a data pattern encoded within the message, the at least one targeted user as an intended target;
- at only one of the users, receiving the message;
- at the only one of the users receiving the message, determining that a preselected number of occurrences of the at least one predefined signal feature of the message has been reached;
- after the only one of the users has determined that the preselected number of occurrences of has been reached, retransmitting, from the transmitter, the message on the bus system; and
- determining one of a number of the users to be awakened and a group of users to be awakened based on the retransmitted message, each user being awakened only if the data pattern identifies at least one of the user and a group to which the user belongs;

wherein a length of the message is at least two bits, and
wherein the preselected number of occurrences of the at least one predefined signal feature is greater than one.

10. A hardware arrangement, comprising:
a plurality of users connected to a bus system, a first one of the plurality of users configured to communicate over the bus system while the remainder of the users are in one of a sleep mode and a power-off mode; and
a transmitter configured to transmit a wakeup message over the bus, wherein after receiving the message, the first user, in response to determining that a preselected number of occurrences of at least one predefined signal feature of the message has been reached, initiates a wakeup logic unit that, upon receipt of a subsequent retransmission of the message, reads out an identifier corresponding to a user or user group from the retransmitted message so that all users associated with the identifier can be awakened.

11. The hardware arrangement of claim 10, wherein the first user includes a counter that is incremented in accordance with each occurrence of the at least one predefined signal feature.

12. The hardware arrangement of claim 10, wherein an encoding of the identifier is read out by the wakeup logic unit in a manner that is time-independent of a transmission rate of the bus system.

13. The hardware arrangement of claim 12, wherein a block of the encoding contains a logical 0 when a first set of bits is set high and the block contains a logical 1 when a second set of bits is set high.

14. The hardware arrangement of claim 12, wherein the identifier is encoded in a data field of the message, the data field being divided into data blocks, at least one bit of the identifier being encoded in each block.

* * * * *